US010715022B2

(12) United States Patent
Takahashi et al.

(10) Patent No.: US 10,715,022 B2
(45) Date of Patent: Jul. 14, 2020

(54) ACTUATOR AND ELECTRIC BEAUTY DEVICE

(71) Applicants: Yuki Takahashi, Tokyo (JP); Masami Kamijo, Tokyo (JP); Kazutaka Sakaguchi, Tokyo (JP); Yasutaka Kitamura, Tokyo (JP); Masaharu Kagami, Tokyo (JP); Shigenori Inamoto, Tokyo (JP)

(72) Inventors: Yuki Takahashi, Tokyo (JP); Masami Kamijo, Tokyo (JP); Kazutaka Sakaguchi, Tokyo (JP); Yasutaka Kitamura, Tokyo (JP); Masaharu Kagami, Tokyo (JP); Shigenori Inamoto, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 18 days.

(21) Appl. No.: 15/749,896

(22) PCT Filed: Aug. 2, 2016

(86) PCT No.: PCT/JP2016/003562
§ 371 (c)(1),
(2) Date: Feb. 2, 2018

(87) PCT Pub. No.: WO2017/022243
PCT Pub. Date: Feb. 9, 2017

(65) Prior Publication Data
US 2018/0234000 A1 Aug. 16, 2018

(30) Foreign Application Priority Data
Aug. 4, 2015 (JP) ................................. 2015-154528

(51) Int. Cl.
H02K 33/16 (2006.01)
H02K 21/22 (2006.01)
(Continued)

(52) U.S. Cl.
CPC ........... H02K 33/16 (2013.01); B26B 19/282 (2013.01); H02K 21/145 (2013.01); H02K 21/22 (2013.01);
(Continued)

(58) Field of Classification Search
CPC ...... H02K 33/16; H02K 21/145; H02K 21/22; H02K 21/227; H02K 33/02; H02K 1/145;
(Continued)

(56) References Cited

U.S. PATENT DOCUMENTS 5,980,819 A * 11/1999 Nakagawa .......... C22C 32/0089
419/27
7,541,708 B2 * 6/2009 Ishikawa .................. H02K 1/02
310/90
(Continued)

FOREIGN PATENT DOCUMENTS

DE 20309115 U1 9/2003
EP 0501521 * 9/1992 ............. H02K 29/08
37/10
(Continued)

OTHER PUBLICATIONS

International Search Report from International Application No. PCT/JP2016/003562 dated Oct. 25, 2016.
(Continued)

Primary Examiner — Alfonso Perez Borroto
Assistant Examiner — Ahmed Elnakib
(74) Attorney, Agent, or Firm — Brundidge & Stanger, P.C.

(57) ABSTRACT

The purpose of the present invention is to provide an actuator that has a simple configuration and can stably
(Continued)

achieve high output without the occurrence of magnetic saturation. This actuator has: a movable body provided with a cylindrical magnet section having alternately N-pole faces and S-pole faces on the peripheral surface surrounding a rotation shaft; and a fixed body provided with, pole tooth surfaces of the same number as the N-pole faces and the S-pole faces, and a coil that excites the pole tooth sections. The movable body has as a turning reference position a position at which the center of the pole tooth surfaces in the circumferential direction and the switching position of the pole faces of the magnet section face each other, and is held to the fixed body so as to be turnable back and forth around the rotation shaft in the circumferential direction.

4 Claims, 16 Drawing Sheets

(51) Int. Cl.
 B26B 19/28 (2006.01)
 H02K 21/14 (2006.01)
 H02K 33/02 (2006.01)
 F16C 33/10 (2006.01)
 F16C 33/12 (2006.01)
 H02K 1/14 (2006.01)
 A61C 17/34 (2006.01)

(52) U.S. Cl.
 CPC ........... *H02K 21/227* (2013.01); *H02K 33/02* (2013.01); *A61C 17/34* (2013.01); *B26B 19/28* (2013.01); *F16C 33/104* (2013.01); *F16C 33/128* (2013.01); *F16C 2202/42* (2013.01); *F16C 2204/60* (2013.01); *H02K 1/145* (2013.01)

(58) Field of Classification Search
 CPC ....... B26B 19/282; B26B 19/28; A61C 17/34; F16C 33/104; F16C 33/128; F16C 2202/42; F16C 2204/60
 USPC .............................................. 310/15, 47, 50
 See application file for complete search history.

(56) References Cited

U.S. PATENT DOCUMENTS

| | | | |
|---|---|---|---|
| 2007/0011834 A1 | 1/2007 | Shimizu et al. | |
| 2007/0145832 A1* | 6/2007 | Shimizu | H02K 33/06 310/15 |
| 2013/0193780 A1* | 8/2013 | Takahashi | H02K 33/16 310/25 |
| 2014/0117788 A1* | 5/2014 | Takahashi | H02K 33/16 310/38 |
| 2018/0215055 A1* | 8/2018 | Takahashi | H02K 21/227 |
| 2018/0234000 A1* | 8/2018 | Takahashi | H02K 21/145 |

FOREIGN PATENT DOCUMENTS

| | | |
|---|---|---|
| JP | 2001-170562 A | 6/2001 |
| JP | 3427468 B2 | 7/2003 |
| JP | 2004-343932 A | 12/2004 |
| JP | 2006-189081 A | 7/2006 |
| JP | 2007-060741 A | 3/2007 |
| JP | 4123232 B2 | 7/2008 |
| JP | 2010-104718 A | 5/2010 |
| JP | 2012-213683 A | 11/2012 |
| JP | 2014-093833 A | 5/2014 |

OTHER PUBLICATIONS

Extended European Search Report issued in EP 16832524.9 dated Mar. 8, 2019, 10 pages.

* cited by examiner

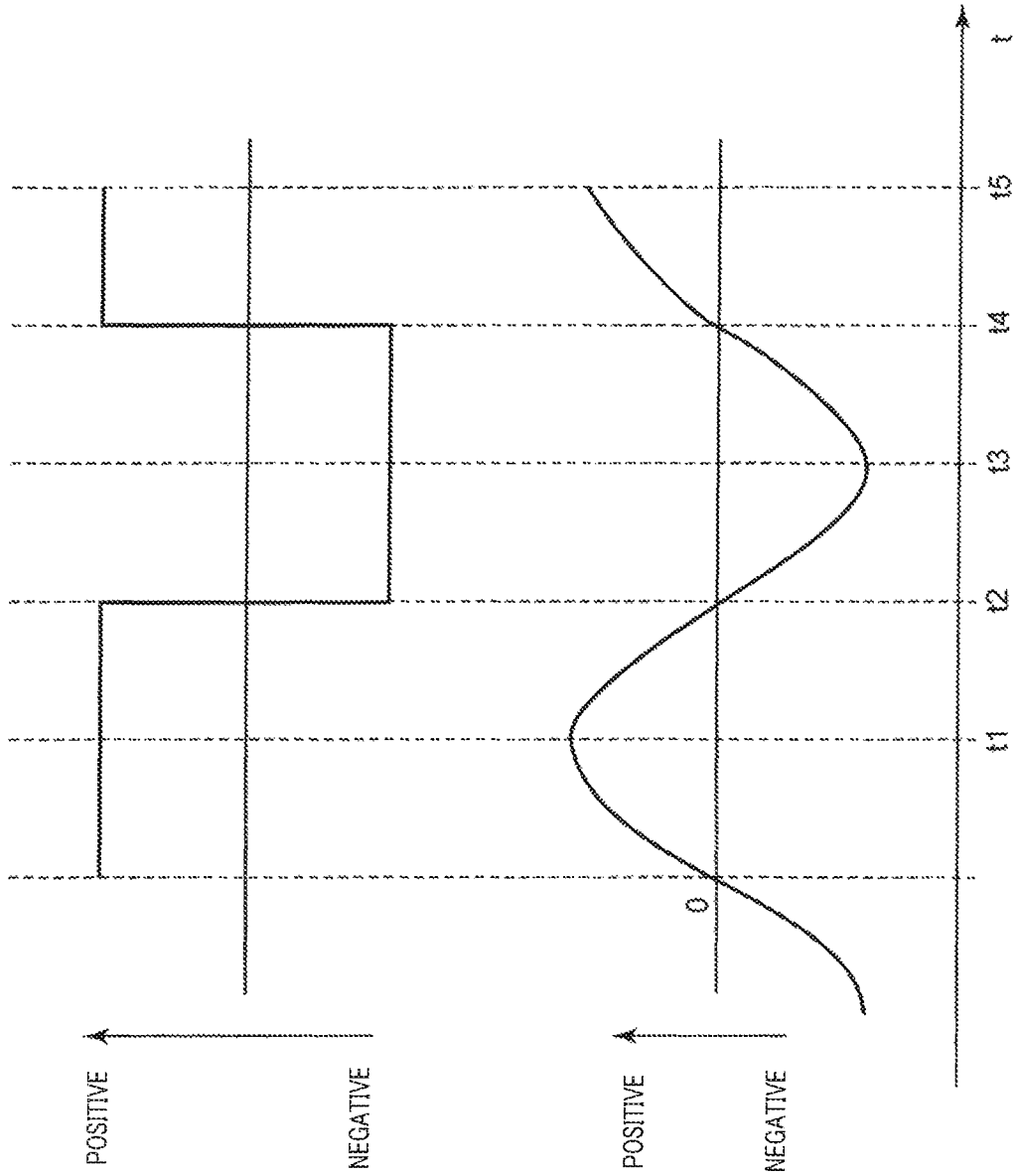

ACTUATOR AND ELECTRIC BEAUTY DEVICE

TECHNICAL FIELD

The present invention relates to a resonant rotation-type actuator and an electric beauty device.

BACKGROUND ART

Conventionally, an electric beauty device such as an electric razor, an electric hair clipper, an electric toothbrush or an electric face-wash brush, incorporates a motion conversion apparatus that converts rotational motion of a motor incorporated therein into reciprocating motion. An inner blade of an electric razor, a movable blade of an electric hair clipper, a toothbrush of an electric toothbrush or the like is coupled to the motion conversion apparatus and brought into reciprocating motion, whereby desired beautification treatment is performed. Such motion conversion apparatus suffers from a low efficiency of conversion from rotational motion to reciprocating motion.

In recent year, from the perspective of motion conversion efficiency, beauty devices using an electromagnetically driven linear actuator have been known (for example, Patent Literatures 1 and 2). A general linear actuator includes a fixed element including a coil and a movable element that is a magnetic body, and performs desired beauty treatment by driving the movable element to reciprocate relative to the fixed element via an electromagnetic force.

In particular, Patent Literature 2 discloses a linear resonant actuator to be used for an electric razor, the actuator including a reciprocating motion-type electric motor drive for bringing a movable element into reciprocating motion relative to a fixed element. This electric motor drive is compatible with a movable blade of any of various blade heads and includes a plurality of movable elements to be driven by a single fixed element, the movable elements having natural frequencies that are substantially equal to one another. Also, what is called resonant rotation-type actuators employing a VCM structure have been known (see, for example, Patent Literature 3).

CITATION LIST

Patent Literature

PTL 1
Japanese Patent No. 4123232
PTL 2
Japanese Patent No. 3427468
PTL 3
Japanese Patent Application Laid-Open No. 2010-104718

SUMMARY OF INVENTION

Technical Problem

As an actuator to be used for an electric beauty device and brought into rotational reciprocating motion, an actuator that stably provides a high power with a simpler configuration is desirable. For example, in a configuration using a DC motor, the rotation frequency of the motor is lowered by load at the time of the motor being driven, and the rotation speed thus decreases, causing fluctuation in rotation speed, which may provide a feeling of discomfort to a user. Also, where the linear resonant actuator indicated in PTL2 is used, the speed of the movable body is set according to driving at a drive frequency because of resonant driving, and thus the actuator is driven at a constant speed, which provides a feeling of comfort in use. However, as indicated in PTL 2, many components are included and the actuator may thus have a large size, which requires a wide space for disposing the actuator. Furthermore, because of the inclusion of many components, facing surfaces of magnetic poles, which affect a magnitude of a drive force to be generated, may be narrow, which makes it difficult to provide a design with high conversion efficiency.

Also, since a resonant rotation-type actuator has a VCM structure, a magnetic resistance is large, which makes it difficult to provide a design with high conversion efficiency, causes an increase in volume of a magnet and requires high cost. Furthermore, since the actuator has a structure using a single-pole magnetization magnet, a torque generation section of a coil, which affects a magnitude of a drive force to be generated, cannot be disposed around an entire circumference of the coil. Consequently, there is the problem of poor efficiency of conversion into reciprocating motion. Also, in a magnetic circuit of an actuator, it is necessary to prevent a power decrease due to a torque constant decrease caused by a magnetic resistance (reluctance) increase resulting from occurrence of magnetic saturation by magnetic flux concentration.

For such actuator used for an electric beauty device, there is a demand for a high-power actuator that enables high efficiency of conversion into reciprocating motion to be set with a simple configuration.

An object of the present invention is to provide an actuator and an electric beauty device that enable provision of a stable high power with a simple configuration without occurrence of magnetic saturation.

Solution to Problem

An aspect of an actuator of the present invention includes: a movable body including a rotation shaft, and a cylindrical magnet section including N-pole faces and S-pole faces circumferentially alternately on a surrounding circumferential surface around the rotation shaft; and a fixed body including a bearing that allows the rotation shaft to be inserted thereto, a number of pole teeth surfaces arranged so as to face the circumferential surface of the magnet section and circumferentially surrounding the bearing, the number of pole teeth surfaces being equal to a number of the N-pole faces and the S-pole faces, and a coil that upon supply of a current, excites the pole teeth surfaces so that the pole teeth surfaces have circumferentially alternately different polarities, in which with a position at which a circumferential center of each pole teeth surface and a switching position between corresponding pole faces in the magnet face each other as a turning reference position, the movable body is held by the fixed body in such a manner that the movable body can turn circumferentially back and forth around the rotation shaft, and the bearing is a magnetic body.

An electric beauty device of the present invention includes the actuator described above.

Advantageous Effects of Invention

The present invention enables provision of a stable high power with a simple configuration, without occurrence of magnetic saturation.

BRIEF DESCRIPTION OF DRAWINGS

FIGS. 8A and 8B are diagrams each illustrating a cycle of an alternate current supplied to a coil via an alternate current input section in the actuator;

DESCRIPTION OF EMBODIMENT

An embodiment of the present invention will be described in detail below with reference to the accompanying drawings.

Figure 1:
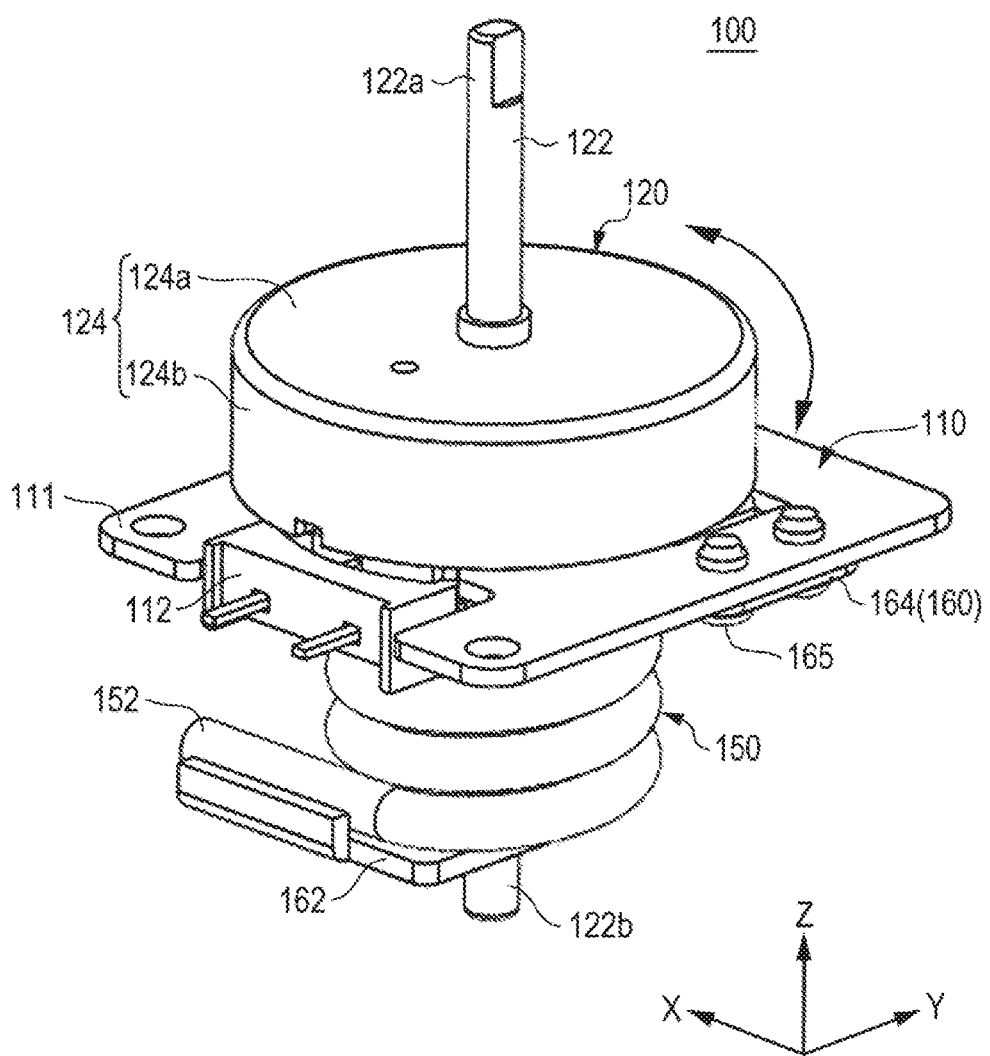
FIG. 1 is a perspective view illustrating an actuator according to an embodiment of the present invention.
Figure 2:
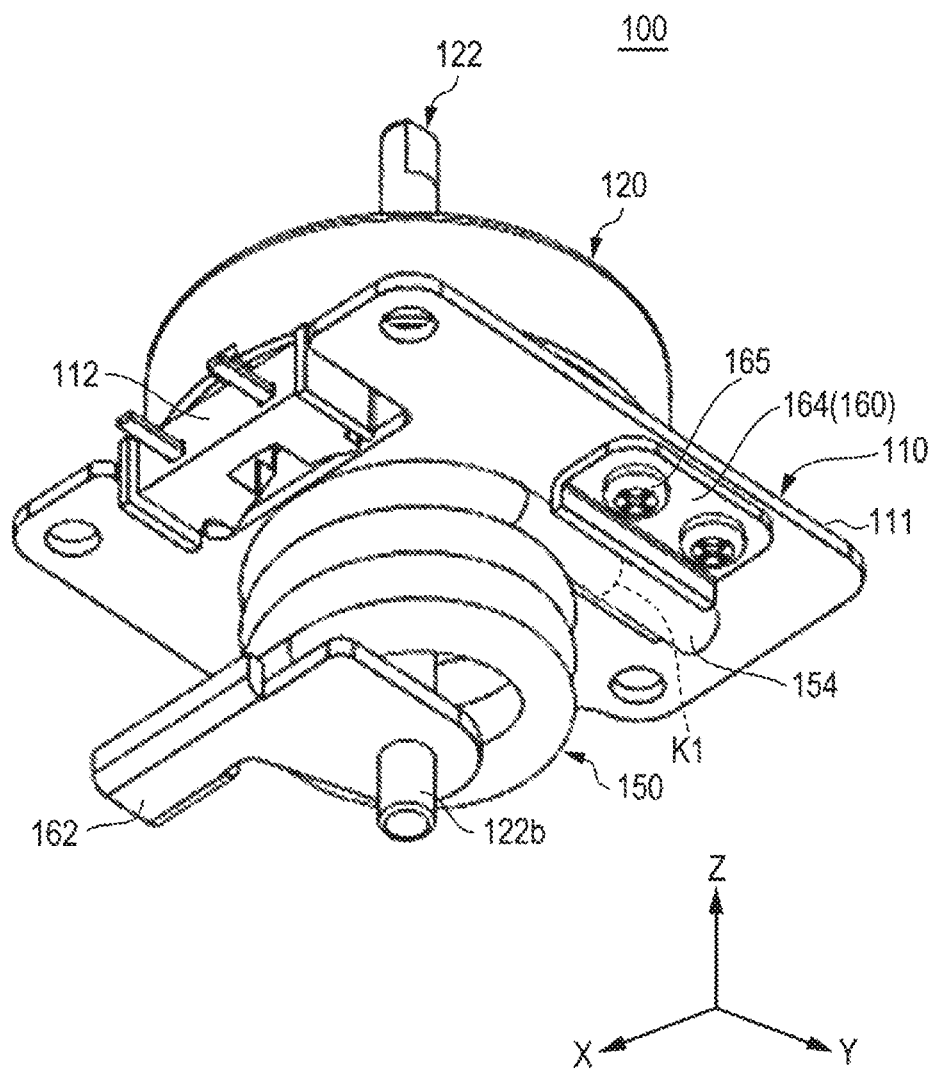
FIG. 2 is a perspective view illustrating a bottom surface of the actuator.
Figure 3:
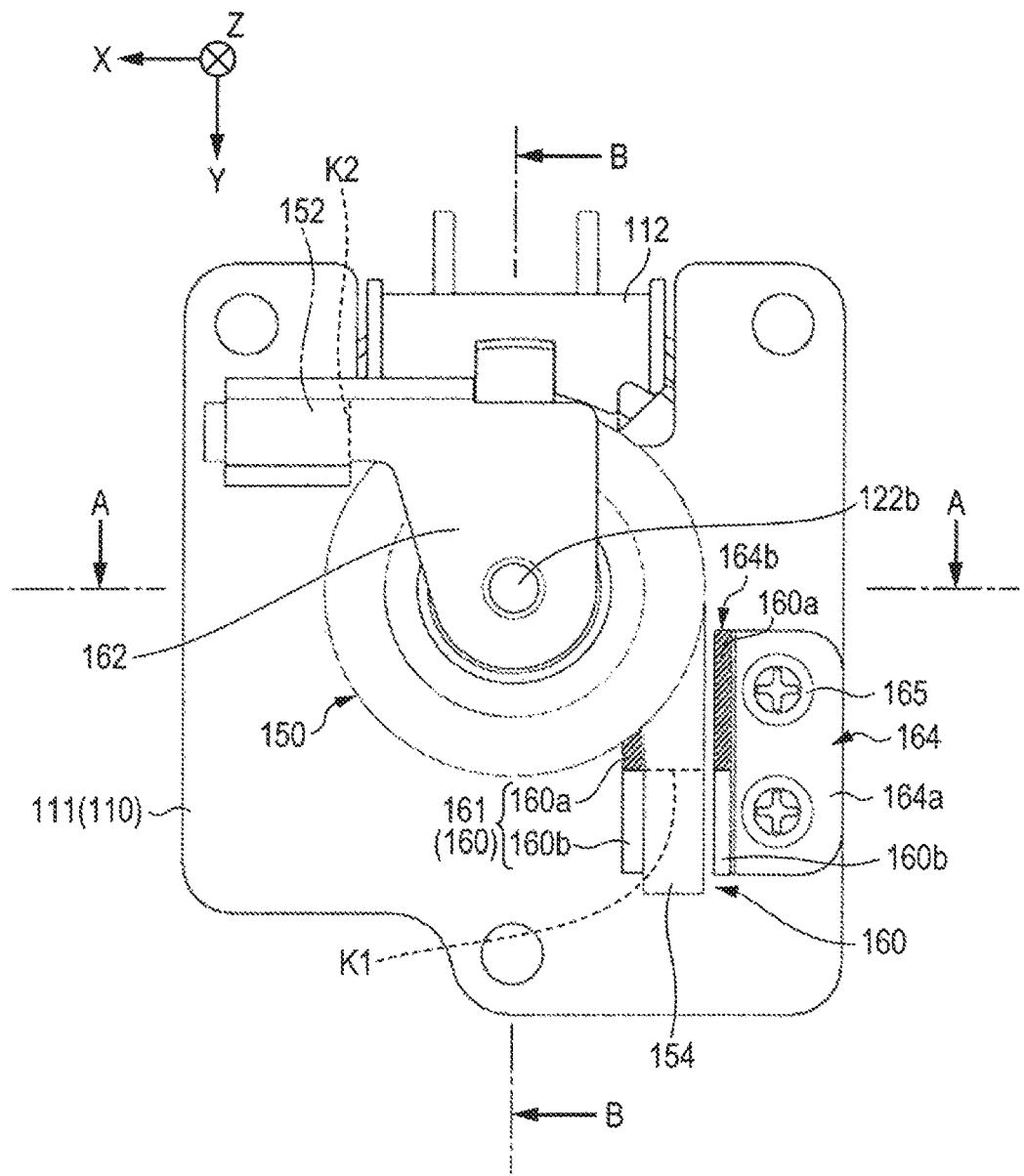
FIG. 3 is a bottom view of the actuator.
Figure 4:
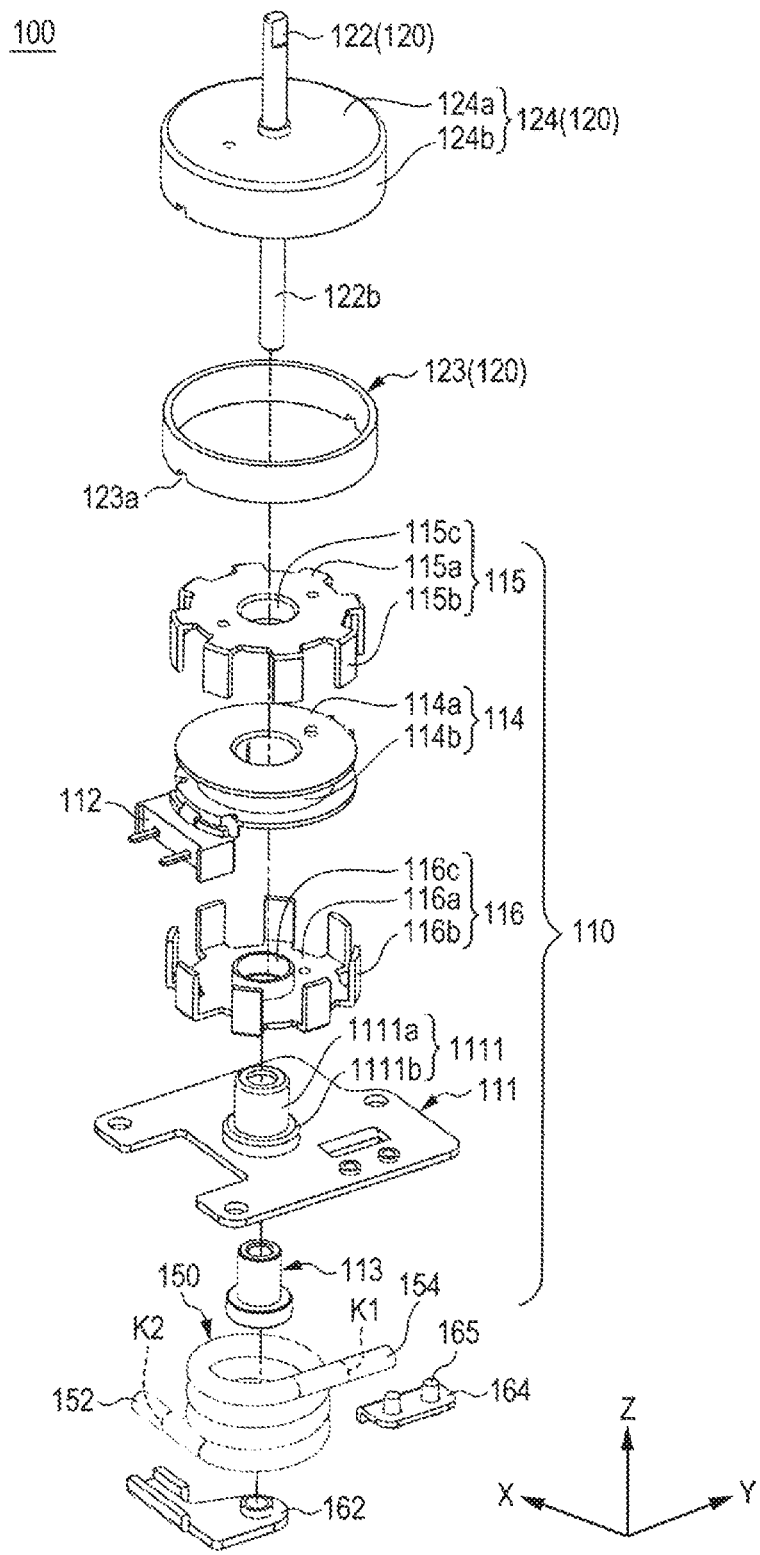
FIG. 4 is an exploded perspective view of a major part of the actuator.
Figure 5:
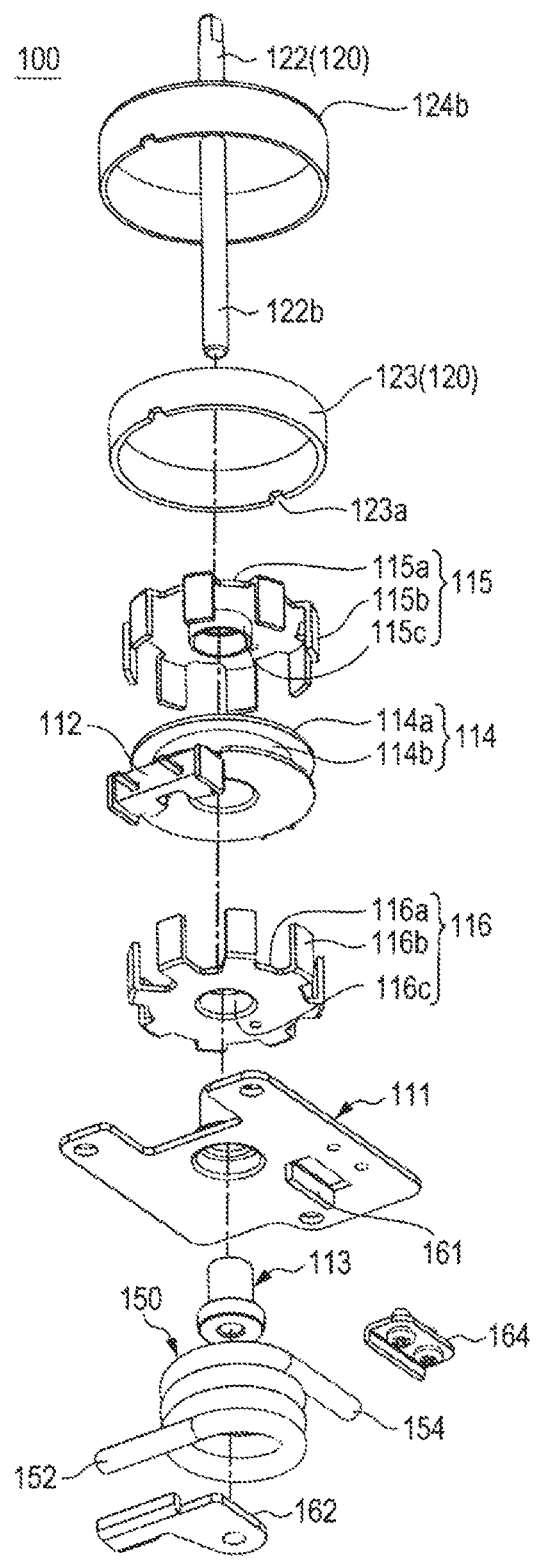
FIG. 5 is an exploded perspective view of the major part of the actuator illustrated in FIG. 3 as viewed from below.
Figure 6:
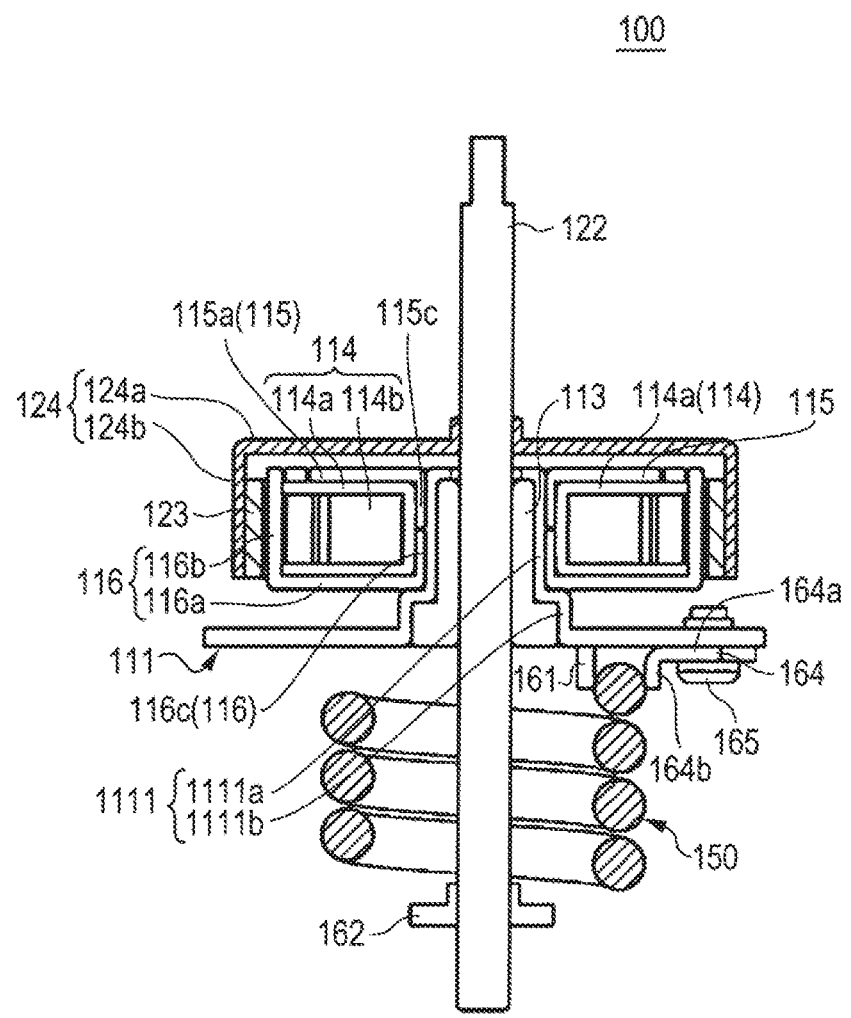
FIG. 6 is a cross-sectional view along the line indicated by arrows A-A in FIG. 3.
Figure 7:
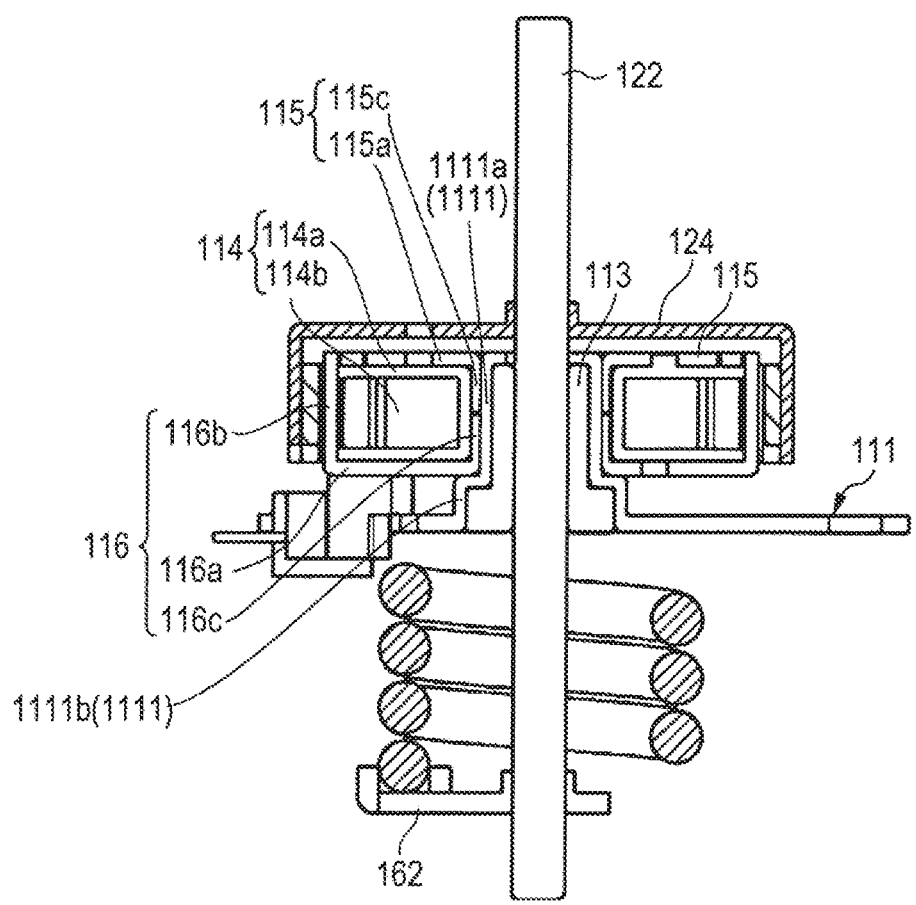
FIG. 7 is a cross-sectional view along the line indicated arrows B-B in FIG. 3.
Figure 11:
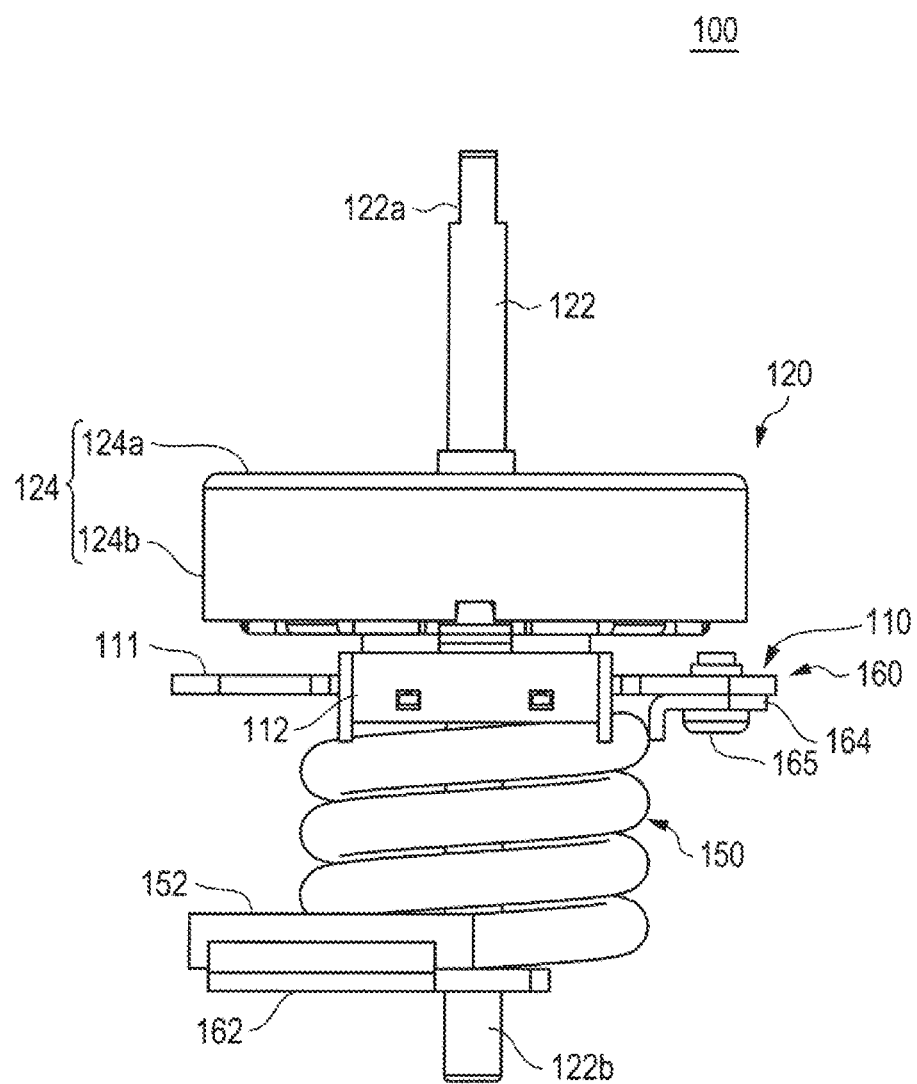
FIG. 11 is a front view of an actuator according to an embodiment of the present invention.
Figure 12:
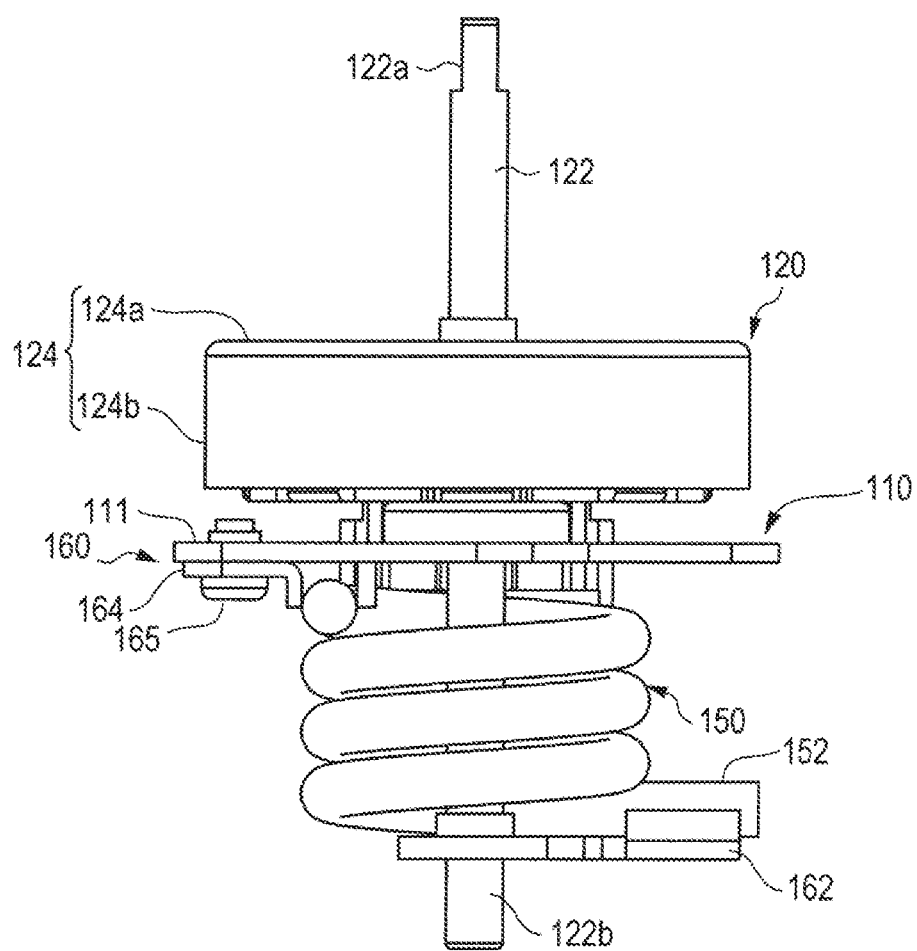
FIG. 12 is a back view of an actuator according to an embodiment of the present invention.
Figure 13:
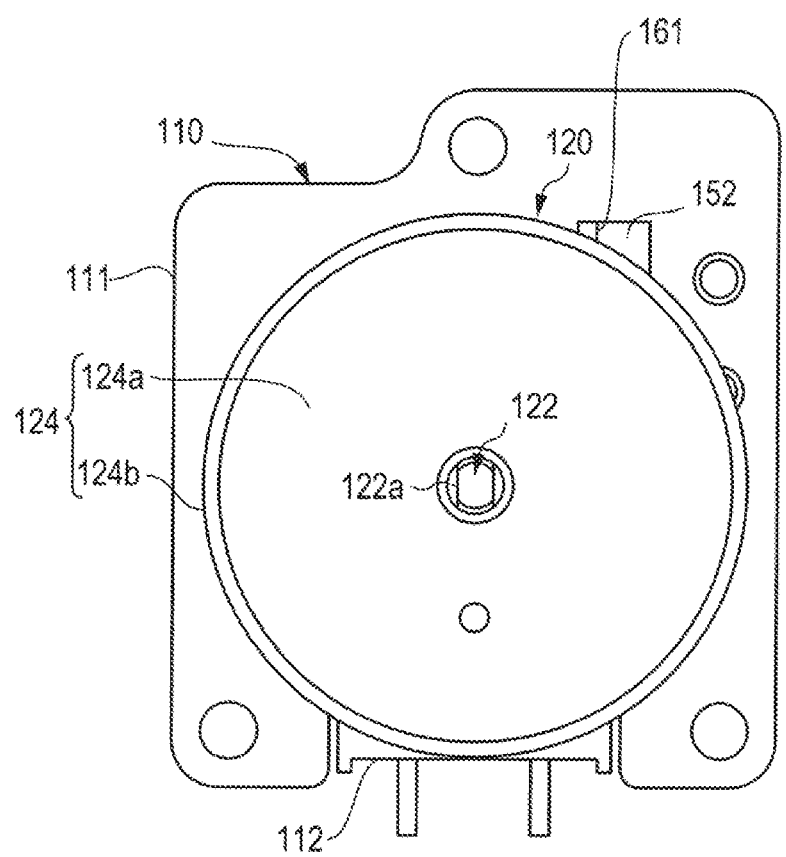
FIG. 13 is a plan view of an actuator according to an embodiment of the present invention.
Figure 14:
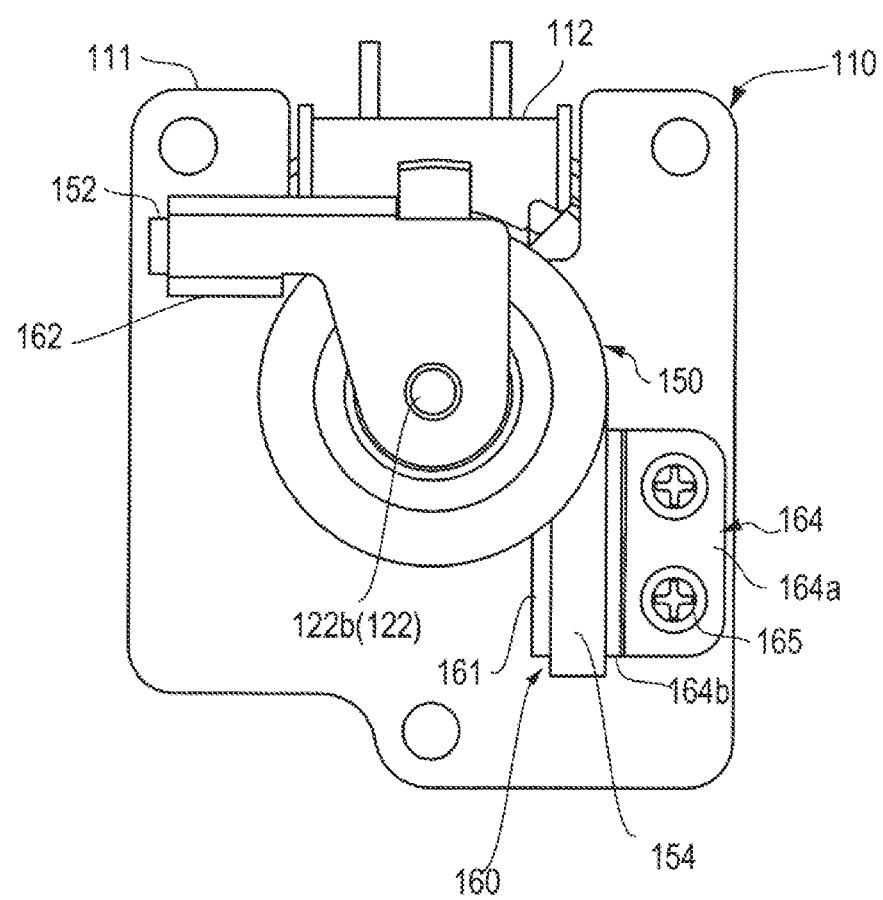
FIG. 14 is a bottom view of an actuator according to an embodiment of the present invention.
Figure 15:
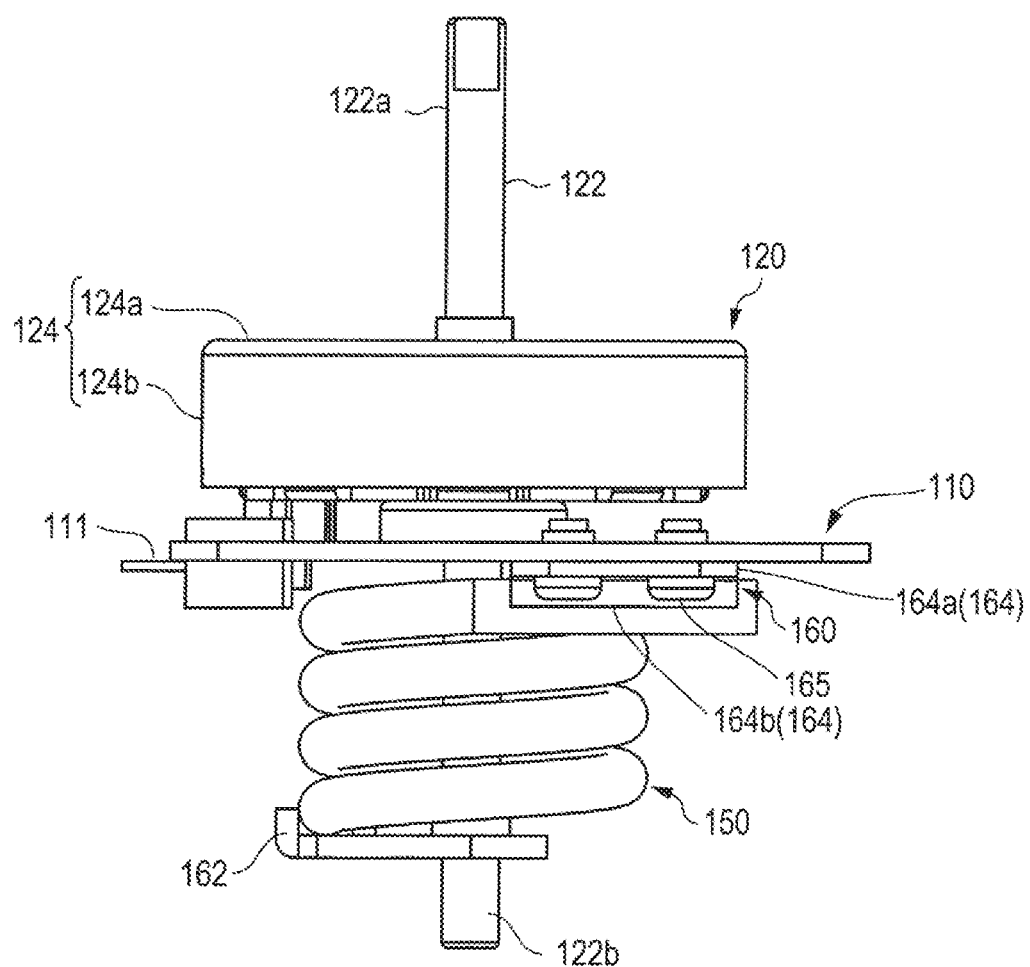
FIG. 15 is a right side view of an actuator according to an embodiment of the present invention.
Figure 16:
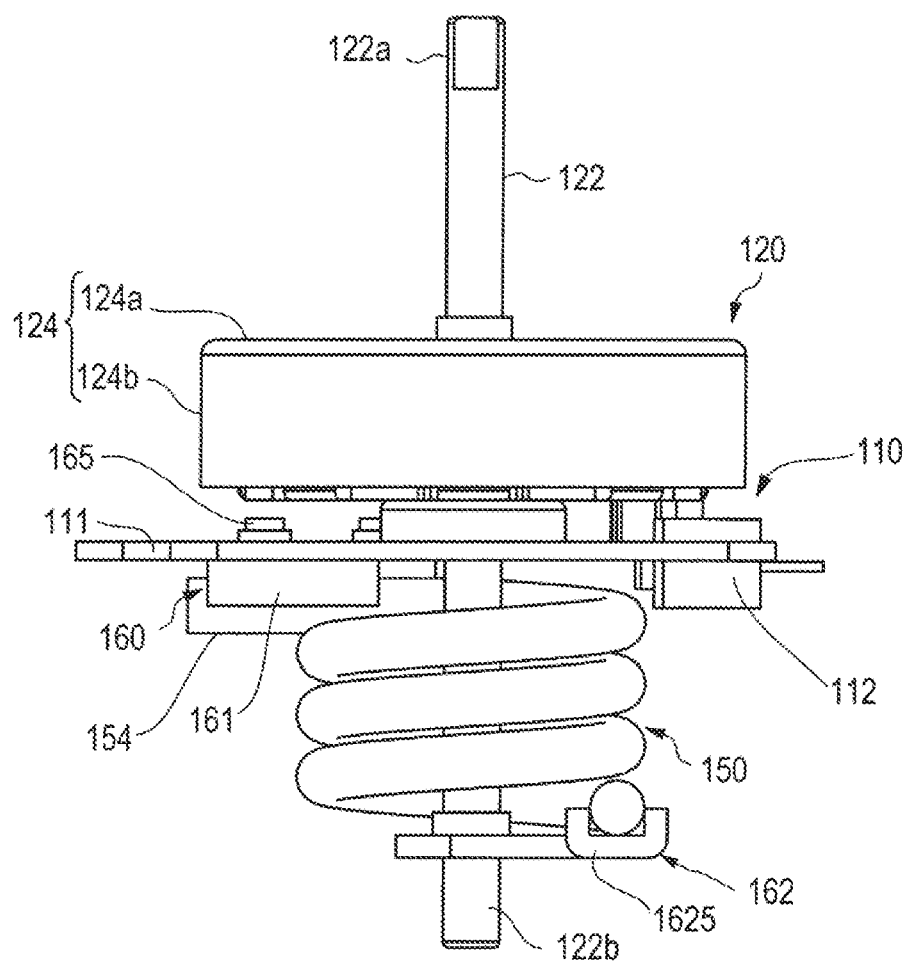
FIG. 16 is a left side view of an actuator according to an embodiment of the present invention.

FIG. 1 is a perspective view illustrating an actuator according to an embodiment of the present invention; FIG. 2 is a perspective view illustrating a bottom surface of the actuator; and FIG. 3 is a bottom view of the actuator. Also, FIG. 4 is an exploded perspective view of a major part of the actuator, and FIG. 5 is an exploded perspective view of the major part of the actuator illustrated in FIG. 3 as viewed from below. FIG. 6 is a cross-sectional view along the line indicated by arrows A-A in FIG. 3; and FIG. 7 is a cross-sectional view along the line indicated by arrows B-B in FIG. 3. FIGS. 11 to 16 are six side views of an actuator according to an embodiment of the present invention. More specifically, FIG. 11 is a front view of an actuator according to an embodiment of the present invention; FIG. 12 is a back view of the actuator; FIG. 13 is a plan view of the actuator; FIG. 14 is a bottom view of the actuator; FIG. 15 is a right side view of the actuator; and FIG. 16 is a left side view of the actuator.

Actuator 100, which is illustrated in FIGS. 1, 2 and 11 to 16, includes fixed body 110, movable body 120, spring material 150 (see FIG. 2) that causes fixed body 110 to movably support movable body 120, and alternate current supply input section (hereinafter referred to as "alternate current input section") 112.

In actuator 100 illustrated in FIGS. 1 and 2, movable body 120 is capable of moving relative to fixed body 110 upon electric power supply to coil section 114, which is input from alternate current input section 112. Rotation shaft 122 of movable body 120 turns in forward and reverse directions (directions indicated by the arrows in FIG. 1) within a predetermined angle range and thereby outputs rotational reciprocating vibration to the outside.

As illustrated in FIGS. 3 to 7, fixed body 110 includes base plate 111, bearing 113, annular coil section 114, and comb teeth-like upper and lower yokes (core) 115, 116 including pole teeth (pole teeth surfaces) 115b, 116b arranged along an outer circumference of coil section 114, respectively.

Fixed body 110 includes base plate 111 formed of a magnetic body, and hollow tubular portion 1111 projecting toward the upper side (movable body 120 side) is provided in base plate 111. Bearing 113 is press-fitted in tubular portion 1111. Tubular portion 1111 is shaped so as to vertically project from the lower side toward the upper side of base plate 111, via drawing of base plate 111. Tubular portion 1111 includes tube portion body 1111a and base portion 1111b having an outer diameter that is larger than that of tube portion body 1111a.

Coil section 114 surrounded by upper and lower yokes 115, 116 are externally fitted on tube portion body 1111a from the upper side. Also, coil section 114 surrounded by upper and lower yokes 115, 116 is caught on an upper surface of base portion 1111b.

Bearing 113 is also formed so as to conform to a shape having a stepped outer diameter provided by tube portion body 1111a and base portion 1111b. In other words, the outer diameter of bearing 113 on the side toward which bearing 113 is press-fitted into tubular portion 1111 (outer diameter on the distal end side) is smaller than the outer diameter on the proximal end side, and at the time of the press-fitting, the proximal end side is caught on the back side of base portion 1111b. Tubular portion 1111 has a vertical dimension (axial length) that is the same as that of the core (upper and lower yokes 115, 116 with coil section 114 sandwiched therebetween), and an upper end surface of tubular portion 1111 forms a part of an upper surface of fixed body (stator) 110.

Bearing 113 is press-fitted into tubular portion 1111 from the lower side of base plate 111. Bearing 113 is fitted in tubular portion 1111 and fixed in a state in which bearing 113 is provided upright vertically from a bottom part of base plate 111. As described above, bearing 113 can stably be fixed in base plate 111 with high precision by being press-fitted into the base plate 111.

Rotation shaft 122 of movable body 120 is inserted in bearing 113, and bearing 113 rotatably supports rotation shaft 122. Bearing 113 is a magnetic body and is, preferably, an oil-impregnated sintered bearing having a magnetic property. Bearing 113 is formed by, e.g., an iron-based sintered material, which is, in addition, is preferably a material having a high saturation magnetic flux density. Examples of the oil-impregnated sintered bearing include, e.g., Porite PI001 (registered trademark). In the present embodiment, bearing 113 has a vertical (axial) length that is substantially equal to a vertical length of tubular portion 1111. Also, if bearing 113 is formed by a sintered material, bearing 113 is made to have a thickness of at least no less than 1 mm.

Coil section 114 surrounded by upper and lower yokes 115, 116 is disposed around an outer circumference of bearing 113 with tubular portion 1111 of base plate 111 interposed therebetween.

Coil section 114 is formed by circumferentially winding coil 114b around a bobbin 114a. Bobbin 114a is used jointly with coil 114b for generating a drive source for actuator 100.

Bobbin 114*a* is coaxial to rotation shaft 122 and coil 114*b*. A coil winding of coil 114*b* is connected to alternate current input section 112, and is connected to an alternate current supply section via alternate current input section 112. An alternate current (alternate-current voltage) is supplied from alternate current supply section to coil 114*b* via alternate current input section 112.

Upper and lower yokes (core) 115, 116 are magnetic bodies, and include pole teeth 115*b*, 116*b* in a comb teeth-like form, pole teeth 115*b*, 116*b* being provided vertically from outer circumferential edges of the annular body plate portions 115*a*, 116*a*, respectively. Upper and lower yokes 115, 116 are disposed so as to axially sandwich coil section 114, upper and lower yokes 115, 116 being not in contact with each other. Body plate portions 115*a*, 116*a* of upper and lower yokes 115, 116 are disposed so as to face upper and lower surfaces of coil section 114 that are axially spaced from each other, respectively. Also, pole teeth 115*b*, 116*b* of upper and lower yokes 115, 116 are circumferentially alternately disposed so as to surround an outer circumferential surface of coil section 114 and are thus positioned in a circular pattern.

Also, tubular core inner circumferential portions 115*c*, 116*c* are formed so as to surround respective opening portions in centers of annular body plate portions 115*a*, 116*a* of upper and lower yokes 115, 116, respectively.

Core inner circumferential portions 115*c*, 116*c* are formed by drawing at centers of plate-like body plate portions 115*a*, 116*a*, respectively.

In upper yoke 115, core inner circumferential portion 115*c* is formed so as to project in a direction that is the same as a direction in which pole teeth 115*b* project. In lower yoke 116, core inner circumferential portion 116*c* is formed so as to project in a direction that is the same as a direction in which pole teeth 116*b* project.

Upper yoke 115 is fitted on coil section 114 from the upper side of coil section 114, body plate portion 115*a* faces the upper surface of coil section 114, and pole teeth 115*b* are positioned in a comb teeth-like form (at predetermined intervals) along the outer circumferential surface of coil section 114. In addition, core inner circumferential portion 115*c* is inserted to a center opening portion of coil section 114 (more specifically, an opening of bobbin 114*a*) from the upper side.

Lower yoke 116 is fitted on coil section 114 from the lower side of coil section 114, body plate portion 116*a* faces the lower surface of coil section 114, and pole teeth 116*b* is evenly disposed among pole teeth 115*b* positioned along the outer circumferential surface of coil section 114. In addition, core inner circumferential portion 116*c* is inserted to the center opening portion of coil section 114 (more specifically, the opening of bobbin 114*a*) from the lower side.

The core formed by coil section 114 being sandwiched by upper and lower yokes 115, 116 is externally fitted on tube portion body 1111*a* of tubular portion 1111 and caught on base portion 1111*b*, and thus, is attached so as to face base plate 111 with a space corresponding to a height of base portion 1111*b* therebetween.

Here, core inner circumferential portions 115*c*, 116*c* of upper and lower yokes 115, 116 are disposed so as to be in abutment or in abutment with each other inside coil section 114. In FIGS. 6 and 7, distal end portions of core inner circumferential portion 115*c*, 116*c* are in abutment with each other inside coil section 114. Consequently, in addition to bearing 113 and tubular portion 1111 (tube portion body 1111*a*), core inner circumferential portions 115*c*, 116*c* are interposed between bobbin 114*a* and rotation shaft 122.

Core inner circumferential portions 115*c*, 116*c* form a magnetic path surrounding the outer circumferential side of tubular portion 1111, jointly with tubular portion 1111.

The number of poles in pole teeth 115*b*, 116*b* of upper and lower yokes 115, 116 is equal to the number of magnetic poles in magnet 123 (which will be described later) of movable body 120.

With this configuration, upon supply of alternate-current electric power to coil 114*b*, upper yoke 115 and lower yoke 116 are excited and thereby have polarities that are different from each other, and respective pole teeth 115*b*, 116*b* of upper and lower yokes 115, 116 are also excited and thereby have polarities that are different from each other. Upon supply of an alternate current having a frequency that is substantially equal to a resonant frequency of movable body 120 from alternate current input section 112, coil 114*b* excite pole teeth 115*b*, 116*b* so as to exhibit alternately different polarities. In other words, on the outer circumferential surface of coil section 114, different magnetic pole faces are alternately arranged along the outer circumferential surface.

The polarities of pole teeth 115*b*, 116*b* are alternately changed as a result of supply of forward and reverse currents to coil section 114.

Magnet 123 of movable body 120 is disposed so as to face pole teeth 115*b*, 116*b* arranged along the outer circumferential surface of coil section 114, with a predetermined space therebetween.

Here, although pole teeth 115*b*, 116*b* have sixteen poles as with the number of poles in the relevant magnet (which will be described later), the number of poles may be any number as long as the number is no less than two. The number of poles is not limited to this example as long as a plurality of poles are provided. Here, sixteen pole teeth 115*b*, 116*b* are circumferentially alternately arranged so as to face a circumferential surface of magnet 123, and the number of poles is equal to the number of N-poles (N-pole face) and S-poles (S-pole face) in magnet 123.

Movable body 120 includes rotation shaft 122, magnet 123, and rotor cover section 124 that fixes rotation shaft 122 and magnet 123.

Magnet 123 is formed in a cylindrical shape, and is magnetized in such a manner that multiple poles (here, sixteen poles) are circumferentially alternately provided. For magnet 123, e.g., a neodymium bonded magnet, a ferrite bonded magnet, a neodymium sintered magnet or a ferrite rubber magnet is employed.

More specifically, magnet 123 is magnetized so as to have magnetic pole faces having alternately different polarities, such as an N-pole, an S-pole, an N-pole, an S-pole, an N-pole, . . . , circumferentially along a circumferential surface (here, an inner circumferential surface) facing pole teeth 115*b*, 116*b*. A length, in a circumferential direction (here, a circumferential direction orthogonal to the rotation shaft), of each of the magnetized surfaces such as an N-pole, an S-pole, . . . is longer than a length in the circumferential direction of each of pole teeth 115*b*, 116*b*. Here, magnet 123 has an integral configuration having a cylindrical shape.

Magnet 123 is fixed to rotation shaft 122 via rotor cover section 124 formed of a magnetic body.

Pole teeth 115*b*, 116*b* are positioned relative to the magnetized surfaces of the magnet 123 in such a manner that a circumferential center position of each pole tooth 115*b* or 116 is radially aligned with a switching position between magnetized surfaces N, S (an N-pole face and an S-pole face) (division position between magnetized surfaces S, N) in magnet 123 around an axis of the rotation shaft. Here, it is assumed that a position in which each center position and the corresponding switching position are aligned with each other on a same radial straight line around rotation shaft 122 is a turning motion reference position (turning reference position) for movable body 120. In other words, movable body 120 is turnably held by fixed body 110 with a position in which the circumferential center position of each tooth 115b, 116b and the corresponding switching position (division line) between magnetic pole faces in magnet 123 face each other as a turning reference position.

Here, since actuator 100 has sixteen poles, a range of turning of movable body 120 is a range of 11.25 degrees in each of the forward and reverse directions relative to fixed body 110 around each turning reference position. In order to determine a position in which each center position and the corresponding switching position are aligned with each other on a same radial straight line around rotation shaft 122, recess portions 123a are formed in magnet 123. Consequently, each position at which a magnetic pole in magnet 123 switches can easily be set at a center position of pole tooth 115b or 116b to assemble actuator 100. Here, magnet 123 can be selected according to the power of actuator 100.

Rotor cover section 124, which functions as a magnet fixing section, has a cup-like shape formed via drawing, and is formed by hanging tubular portion 124b from an outer circumference of disk-like fixing section body 124a. Magnet 123 is fixed to an inner circumferential surface of tubular portion 124b.

Rotation shaft 122 orthogonally inserted through a center portion of fixing section body 124a of rotor cover section 124 is fixed to the center portion in such a manner that distal end portion 122a projects to the outside. Here, rotor cover section 124 and rotation shaft 122 are fixed to each other via welding. Since rotor cover section 124 is fixed to rotation shaft 122 via welding, rotor cover section 124 can be fixed to rotation shaft 122 after assembly of rotation shaft 122 to actuator 100. Also, rotor cover section 124 may be fixed to rotation shaft 122 via bonding using an epoxy-based material.

Rotation shaft 122 is inserted through and fixed to rotor cover section 124 on an axis of rotor cover section 124. Rotation shaft 122 is preferably a non-magnetic body. This is because, if rotation shaft 122 is a magnetic body, rotation shaft 122 is attracted to bearing 113 by a magnetic attraction force because of the configuration of a magnetic circuit, which results in large attenuation. In the present embodiment, rotation shaft 122 is formed of austenitic stainless steel (SUS), and is non-magnetic, has high corrosion resistance and is less likely to rust.

Rotation shaft 122 is inserted through a shaft hole of tubular portion 111l formed in fixed body 110 (base plate 111). Another end portion of rotation shaft 122 is fixed to spring material 150 on the back side of base plate 111 and also to base plate 111 via base fixing component (joint part) 164.

Spring material 150 elastically supports movable body 120 against fixed body 110. Here, as spring material 150, a torsion coil spring is employed. Rotation shaft 122 is turnably inserted inside the torsion coil spring. Here, it is preferable that rotation shaft 122 be positioned on an axis of the torsion coil spring and the axis of rotation shaft 122 correspond to a center axis of the torsion.

One end portion 152 of the torsion coil spring, which is spring material 150, is fixed to proximal end portion 122b of rotation shaft 122 via shaft fixing component 162, and other end portion 154 of the torsion coil spring is fixed to base plate 111 via base fixing component (joint part) 164. Here, shaft fixing component 162 is formed so as to include a recess in which one end portion 152 of the spring material is fitted (see recess portion 162S illustrated in FIG. 16), and after one end portion 152 is disposed inside the recess and thereby positioned relative to rotation shaft 122, a position of shaft fixing component 162 relative to rotation shaft 122 can be determined. In other words, shaft fixing component 162 enables spring material 150 to be fixedly attached to rotation shaft 122 via, e.g., welding, according to the position of one end portion 152, with no excess load imposed.

Opposite end portions 152, 154 of spring material 150, which is a torsion coil spring, have reference points K1, K2 for a spring constant (K, which will be described later), respectively, in spring material 150. Spring material 150 is fixed to at least either of movable body 120 and fixed body 110 to which the opposite end portions are fixed, respectively, on the distal end side relative to relevant reference point K1, K2 for the spring constant.

Here, other end portion 154 of spring material 150 is fixed at a part on the distal end side of other end portion 154 relative to reference position K1, which is a reference point for the spring constant, via base fixing component 164.

More specifically, base fixing component 164 is joined to base plate 111 via joint part 160 that restricts movement in X and Y directions, on the distal end side of other end portion 154 of spring material 150 on the lower surface of base plate 111.

Here, joint part 160 includes protruding rib 161 provided upright on base plate 111, base fixing component 164, and screw portions 165 that fix base fixing component 164 to base plate 111 at predetermined positions.

Base fixing component 164 includes body plate 164a fixed to base plate 111 via screw portions 165, and protruding rib 164b vertically provided upright on body plate 164a. Rib 164b of base fixing component 164 includes attachment portion 160b to which the part, on the distal end side relative to reference position K1 (part on the free end side), of other end portion 154 is fixed, and stress relaxation section 160a that upon deformation of spring material 150, abuts against spring material 150 on the one end portion 152 side of spring material 150 relative to reference position K1 and thereby relaxes stress generated at the fixed part of the other end portion 154.

Also, rib 161 includes attachment portion 160b to which the part, on the free end side relative to reference position K1, of other end portion 154 of spring material 150 is fixed, and stress relaxation section 160a that upon deformation of spring material 150, abuts against spring material 150 on the one end portion side of spring material 150 relative to reference position K1 and thereby relaxes stress generated in the fixed part of other end portion 154.

Here, attachment portion 160b is fixed to other end portion 154 via welding. Also, attachment portion 160b may be fixed to other end portion 154 via bonding using an epoxy-based material.

Stress relaxation section 160a abuts against spring material 150, in particular, the torsion coil spring upon deformation of spring material 150 and thereby relaxes stress imposed on other end portion 154.

As described above, at the time of deformation of spring material 150, spring material 150 abuts against stress relaxation section 160a on the coil part side of spring material 150 relative to attachment portion 160b, enabling dispersion of stress localizing on other end portion 154 in spring material 150. Consequently, stress generated as a result of reciprocating rotational motion, that is, vibration of movable body 120 is prevented from localizing on spring material 150 (more specifically, other end portion 154 joined to base plate 111).

Spring material (torsion coil spring) 150 is positioned so that switching positions between adjacent magnetized surfaces having different polarities in the inner circumferential surface of magnet 123 of movable body 120 are located at the respective circumferential centers of pole teeth 115b, 116b of fixed body 110.

Also, spring material (torsion coil spring) 150 can have a spring constant that is constant in a direction of turning of magnet 123, and movable body 120 is movable circumferentially. Spring material 150 enables resonant frequency adjustment for actuator 100.

In actuator 100 having the above configuration, upper and lower yokes 115, 116, that is, pole teeth 115b, 116b are magnetized by alternate-current waves input to coil 114b, to efficiently generate a magnetic attraction force and a repulsion force against magnet 123 of movable body 120. Consequently, magnet 123 of movable body 120 moves in both circumferential directions relative to the centers of pole teeth 115b, 116b, which are turning reference positions, and consequently, magnet 123 itself turns back and forth around rotation shaft 122.

In actuator 100 according to the present embodiment, where J is an inertia moment of movable body 120 and $K_{sp}$ is a spring constant in the torsion direction, movable body 120 vibrates relative to fixed body 110 at resonant frequency $f_r$[Hz] calculated according to equation 1 below.

[1]

$$f_r = \frac{1}{2\pi}\sqrt{\frac{K_{sp}}{J}} \quad \text{(Equation 1)}$$

$f_r$: Resonant frequency [Hz]

In actuator 100 according to the present embodiment, an alternate current having a frequency that is substantially equal to resonant frequency $f_r$ of movable body 120 is supplied from alternate current input section 112 to coil 114b to excite pole teeth 115b, 116b via coil 114b. Consequently, movable body 120 can efficiently be driven.

Movable body 120 in actuator 100 is supported in a spring-mass system structure in which movable body 120 is supported by fixed body 110 via spring material 150. Therefore, upon supply of an alternate current having a frequency that is equal to resonant frequency $f_r$ of movable body 120 to coil 114b, movable body 120 is driven in a resonant condition. Rotational reciprocating vibration generated at this time is transmitted to rotation shaft 122 of movable body 120.

Actuator 100 is driven based on the motion equation indicated in equation 2 below and the circuit equation indicated in equation 3 below.

[2]

$$J\frac{d^2\theta(t)}{dt^2} = K_t i(t) - K_{sp}\theta(t) - D\frac{d\theta(t)}{dt} - T_{Load} \quad \text{(Equation 2)}$$

J: Inertia moment [Kgm²]
θ(t): Angle [rad]
$K_t$: Torque constant [Nm/A]
i(t): Current [A]
$K_{sp}$: Spring constant [Nm/rad]
D: Attenuation coefficient [Nm/(rad/s)]
$T_{Load}$: Load torque [Nm]

[3]

$$e(t) = Ri(t) + L\frac{di(t)}{dt} + K_e\frac{d\theta(t)}{dt} \quad \text{(Equation 3)}$$

e(t): Voltage [V]
R: Resistance [SI]
L: Inductance [H]
$K_e$: Back EMF constant [V/(rad/s)]

In other words, inertia moment J[Kgm²], rotational angle θ(t)[rad], torque constant $K_t$ [Nm/A], current i(t)[A], spring constant $K_{sp}$ [Nm/rad], attenuation coefficient D [Nm/(rad/s)], load torque $T_{Load}$ [Nm], etc., in actuator 100 can arbitrarily be changed within a range in which equation 2 is satisfied. Also, voltage e(t)[V], resistance R[Ω], inductance L[H] and back EMF constant $K_e$ [V/(rad/s] can arbitrarily be changed within a range in which equation 3 is satisfied.

As described above, when actuator 100 is driven at resonant frequency $f_r$ determined by inertia moment J of movable body 120 and spring constant K of spring material (elastic body) 150, a large power can efficiently be obtained.

Next, specific operation of actuator 100 will be described.

Upon a current flowing to coil 114b of coil section 114 (it is assumed that the current flows in the forward direction), pole teeth 115b of upper yoke 115 are excited and thereby each have a polarity (for example, an N-pole), and pole teeth 116b of lower yoke 116 is excited and thereby each have a polarity that is different from that of pole teeth 115b (for example, an S-pole). Division lines between magnetic pole faces (S, N) in magnet 123 of movable body 120 are disposed at center positions in the circumferential direction (turning direction) of respective pole teeth 115b, 116b, that is, the respective turning reference positions, so as to face the respective pole teeth 115b, 116b.

Therefore, in the entire inner circumferential surface of magnet 123, N-pole faces are attracted by pole teeth 115b, which are S-pole faces, and S-pole faces of magnet 123 are attracted by pole teeth 116b, which are N-pole faces, and surfaces having a same polarity repel each other. Consequently, largest torque is generated in the entire inner circumference of magnet 123, and magnet 123 thus turn in one circumferential direction (for example, counterclockwise). Then, each pole face in magnet 123 tries to stop at a position at which the pole face faces a pole tooth 115b or 116b excited so as to have a magnetic pole that is opposite to that of the pole face. When magnet 123 tries to be positioned at this position, torque in a direction opposite to the previous movement direction also acts on magnet 123 because of repulsion between magnet 123 and pole teeth adjacent to the pole faces of magnet 123, the pole teeth having respective magnetic polarities that are the same as those of pole faces.

Also, a biasing force toward the turning reference position side acts on magnet 123 (movable body 120) because of a resilient force of spring material 150. In this state, a current having a direction opposite to the forward current (reverse current) flows into coil section 114. Then, the respective polarities of pole teeth 115b, 116b are changed: each pole teeth 115 that is an N-pole is excited so as to be an S-pole; and each pole teeth 116b that is an S-pole is excited so as to be an N-pole. Consequently, magnet 123 moves in the direction that is opposite to that of the previous movement as a result of generation of torque in the reverse direction by magnetic attraction forces and magnetic repulsion forces generated between the respective pole faces and pole teeth 115b, 116b. Also, this torque acts also via the resilient force of spring material 150.

In other words, as a result of a current flowing in coil 114b in the forward direction and the reverse direction alternately, movable body 120 repeats movement in one circumferential direction, movement toward the turning reference position side via the biasing force of spring material 150, movement in the other circumferential direction beyond the turning reference positions, movement toward the turning reference position side via the biasing force of spring material 150 and movement in the one circumferential direction beyond the turning reference positions, relative to fixed body 110, sequentially. As described above, movable body 120 of actuator 100 turns back and forth, that is, vibrates around rotation shaft 122 and the reference positions and thereby outputs a reciprocating vibration force to the outside via rotation shaft 122.

FIGS. 8A and 8B are diagrams each indicating a cycle of an alternate current supplied to coil 114b of fixed body 110 via alternate current input section 112 in the actuator according to the present embodiment.

The alternate current flowing in the coil may have pulse waves of frequency $f_0$ as illustrated in FIG. 8A or may have sinusoidal waves of frequency $f_0$ as illustrated in FIG. 8B.

A forward current is supplied at time t1 indicated in FIGS. 8A and 8B, and a reverse current is supplied at time t3 indicated in FIGS. 8A and 8B. Also, as indicated in time t4 in FIGS. 8A and 8B, when the direction of the current is changed and magnet 123 thereby turns back to the turning reference positions, a forward current is supplied at time t5. This is an operation for one cycle, and such operation is repeated, whereby movable body 120 repeats movements and thus rotationally vibrate back and forth.

When actuator 100 is assembled, bearing 113 can be inserted to base plate 111 and spring material 150 can be joined to base plate 111 and rotation shaft 122 via shaft fixing component 162 or base fixing component 164. In other words, when actuator 100 is assembled, before coil section 114 surrounded by upper and lower yokes 115, 116 is externally fitted on tubular portion 111l and rotor cover section 124 is fixedly attached to rotation shaft 122 via welding or bonding, spring material 150, which has a manufacturing tolerance, can be provided between rotation shaft 122 of movable body 120 and base plate 111 of fixed body 110 at an early stage regardless of the tolerance. Subsequently, coil section 114 and magnet 123 are assembled thereto.

Furthermore, when actuator 100 is assembled, rotor cover section 124 can be fixed to rotation shaft 122 via welding or bonding lastly. Consequently, if movable body 120 is displaced in a rotation direction, actuator 100 can be assembled while the displacement is adjusted when rotor cover section 124 is fixed to rotation shaft 122. As described above, when actuator 100 is assembled, components to be fixed to each other is joined to each other via, e.g., welding or bonding, enabling elimination of a displacement depending on a degree of variation of spring material 150. Consequently, deterioration in assembling precision of assembled actuator 100 due to variation of spring material 150 can be prevented.

In actuator 100, movable body 120 is brought into rotational reciprocating motion, that is, rotational reciprocating vibration, and the rotational reciprocating vibration is output to the outside via rotation shaft 122. A toothbrush part or a facewash brush part that is provided at a head part so as to be orthogonal to the axis direction and includes a bristle bundle portion or a blade of, e.g., an electric razor, an electric shaver or an electric hair clipper is connected to distal end portion 122a of rotation shaft 122, enabling the brush or the blade to vibrate back and forth.

As described above, actuator 100 is driven by a resonant phenomenon that satisfies equations 2 and 3 and uses the resonant frequency indicated in equation 1. Consequently, in actuator 100, electric power consumed in a steady state has only a loss due to load torque and a loss due to, e.g., friction, and thus, actuator 100 can be driven with low electric power consumption, that is, movable body 120 can be caused to rotationally vibrate back and forth with low electric power consumption.

In the present embodiment, movable body 120 includes cylindrical magnet 123 magnetized so as to have multiple poles (here, sixteen poles), rotor cover section 124 to which magnet 123 is fixed, rotor cover section 124 being a magnetic body, and rotation shaft 122 press-fitted and fixed in the center portion of rotor cover section 124.

Also, fixed body 110 includes bearing 113 supporting rotation shaft 122 of movable body 120, base plate 111 fixing bearing 113, coil section 114 (annular bobbin 114a and coil 114b) fixed to bearing 113, coil section 114 being used for drive source generation, two, upper and lower, comb teeth-like yokes 115, 116 disposed so as to vertically sandwich coil section 114 therebetween, and alternate current input section 112 that connects the winding of coil section 114 to an external terminal.

Upper and lower yokes 115, 116 of fixed body 110 jointly have a number of pole teeth 115b, 116b, the number being equal to the number of magnetic poles in magnet 123 of movable body 120. Upper and lower yokes 115, 116 are magnetized by alternate current waves input to coil section 114 and thus each effectively generate a magnetic attraction force and a magnetic repulsion force.

Magnet 123 has an annular shape and is disposed so as to face pole teeth 115b, 116b arranged so as to provide alternately different polarities on the circumference of fixed body 110.

Consequently, the entire inner circumference of magnet 123 facing pole teeth 115b, 116b can be used as a drive source, enabling provision of actuator 100 having high conversion efficiency. Also, magnetic attraction forces and magnetic repulsion forces are generated on the entire circumference of magnet 123, enabling generation of largest torque.

With this configuration, in actuator 100, a magnetic circuit in which magnetic fluxes from pole teeth 115b, 116b arranged radially, pole teeth 115b being magnetic poles of a same polarity, pole teeth 116b being magnetic poles of a same polarity, all flow so as to be concentrated on the center side through upper and lower yokes 115, 116 is provided. As described above, upon concentration of magnetic fluxes, magnetic saturation occurs and an increase in magnetic resistance (reluctance) occurs, and thus the torque constant is decreased, and as a result, a decrease in characteristic, that is, a decrease in power itself may occur.

However, since in actuator 100 according to the present embodiment, bearing 113 is a magnetic body, and thus, the cross-sectional area of the part around rotation shaft 122 on the inner side of coil section 114 (cross-sectional area of the magnetic path on which magnetic fluxes flow) can be increased.

Consequently, magnetic saturation caused by magnetic fluxes that flow inward from pole teeth 115b, 116b on the outer circumferential side and are concentrated in the center part can be relieved. Consequently, torque constant $K_t$ is increased, enabling enhancement in energy conversion coefficient and thus an increase in power of actuator 100.

Also, in coil section 114, upper and lower yokes 115, 116 include core inner circumferential portion 115c, 116c formed via drawing, in the center portions of annular body plate portions 115a, 116a arranged so as to axially sandwich coil section 114, respectively.

Core inner circumferential portions 115c, 116c are disposed on the inner side of coil section 114 (inside the opening portion at the center of coil section 114 on the inner circumferential side) and externally fitted on tubular portion 1111. Also, the respective distal end portions of core inner circumferential portions 115c, 116c are in abutment with each other on the inner side of coil section 114, and core inner circumferential portions 115c, 116c jointly form a tubular body formed of one magnetic body.

Core inner circumferential portions 115c, 116c enables a further increase in cross-sectional area of the part around the rotation shaft 122 (cross-sectional area of the magnetic path in which magnetic fluxes flow) on the inner side of coil section 114 in addition to the cross-sectional areas of tubular portion 1111 and bearing 113 (magnetic path sectional areas). In addition, core inner circumferential portion 115c, 116c are parts of upper and lower yokes 115, 116, respectively, and thus enable an increase in positional precision and fixation strength of the pole teeth in the upper and lower yokes 115, 116.

Furthermore, core inner circumferential portions 115c, 116c and bearing 113 are substantially equal in vertical dimension to fixed body 110. Also, core inner circumferential portions 115c, 116c are coaxial to tubular portion 1111 and easily have high precision in manufacturing.

Also, since rotation shaft 122 is a non-magnetic body and can prevent generation of a magnetic attraction force at a surface that is in contact with bearing 113. Consequently, generation of an unnecessary frictional force between rotation shaft 122 and bearing 113 is prevented, enabling a decrease in attenuation and thus enhancement in power. In other words, unlike in the case of a magnetic body, rotation shaft 122 prevents an attenuation increase caused as a result of rotation shaft 122 being attached to bearing 113 by a magnetic attraction force.

In the present embodiment, rotation shaft 122 is formed of an austenitic stainless steel (SUS402), and thus, even if distal end portion 122a projects to the outside and is in contact with, e.g., external air or water, distal end portion 122a is less likely to rust because of good corrosion resistance.

Figure 9A:
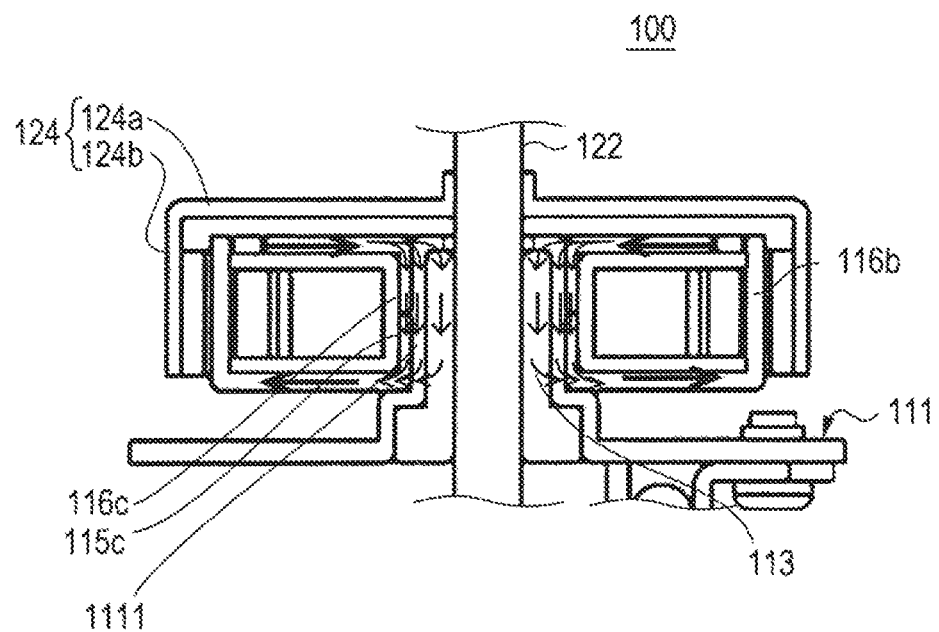
FIGS. 9A and 9B are diagrams for describing a magnetic flux flow according to an embodiment of the present invention.
Figure 9B:
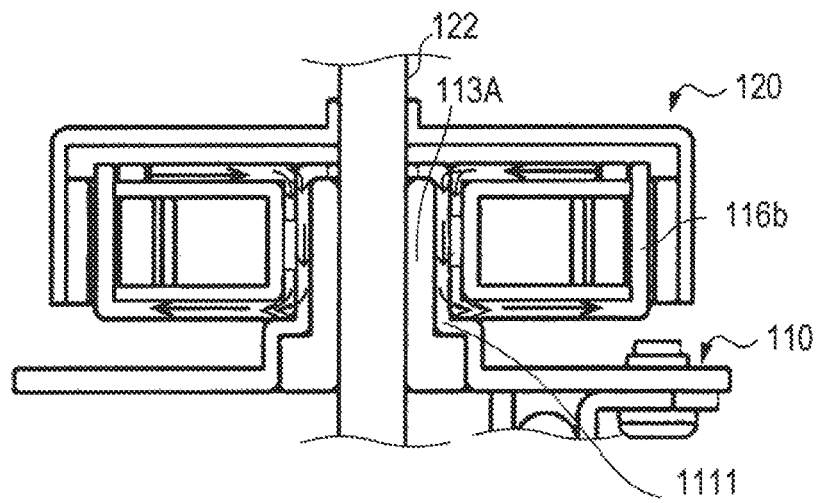
Figure 10:
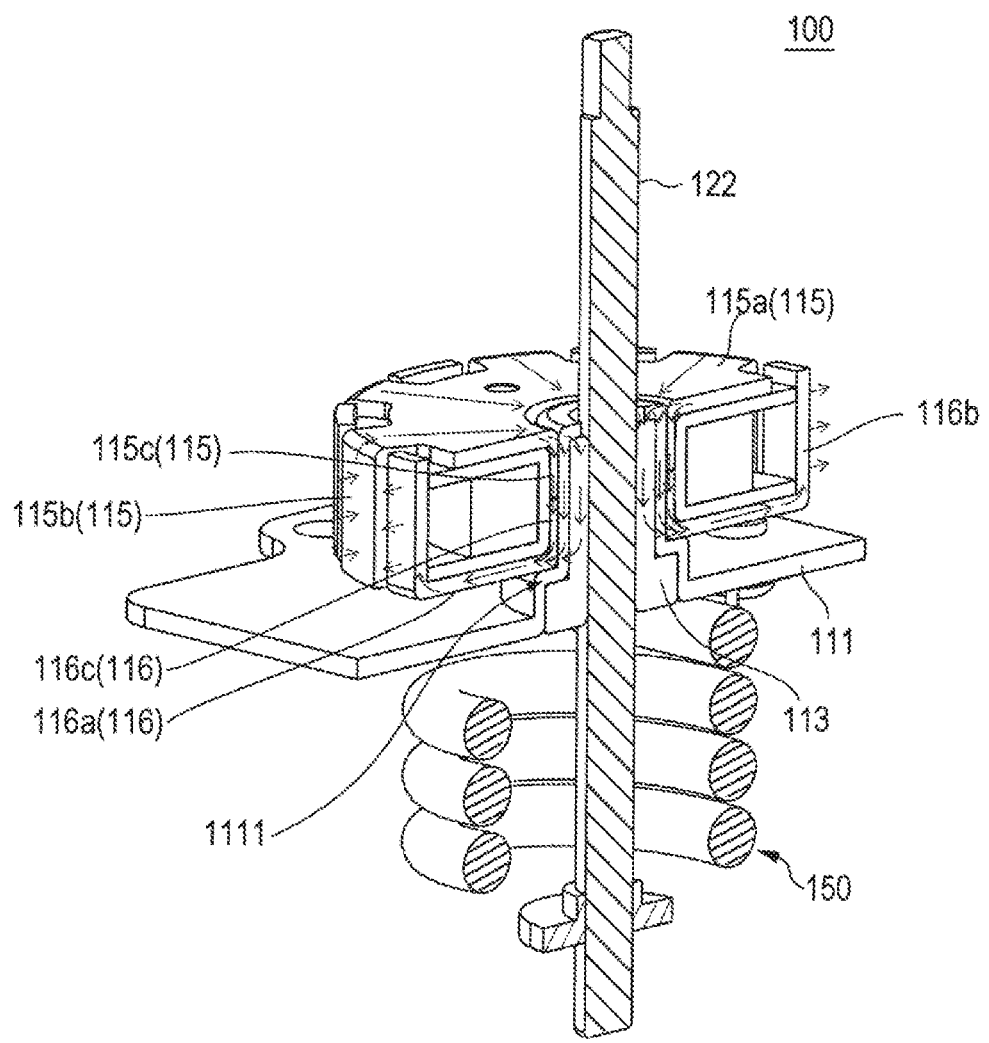
FIG. 10 is a diagram for describing magnetic fluxes according to an embodiment of the present invention.

FIGS. 9A, 9B and 10 are diagrams for describing a magnetic flux flow according to the present embodiment, FIG. 9A indicates a magnetic flux flow according to the present embodiment, and corresponds to FIG. 6. FIG. 9B illustrates a reference structure where no magnetic saturation is taken into consideration in the configuration according to the present embodiment, more specifically, a structure in which bearing 113A is not a magnetic body and core inner circumferential portions 115c, 116c are not included in a magnetic path. FIG. 10 is a perspective cross-sectional view along line A-A in FIG. 3, and for sake of simplicity, illustration of the rotor part including magnet 123 and rotor cover section 124 is omitted.

In other words, in the present embodiment, as illustrated in FIG. 9A, bearing 113, tubular portion 1111 of base plate 111 and core inner circumferential portions 115c, 116c, which all have a magnetic property, are disposed between rotation shaft 122, which is a non-magnetic body, and coil 114b, whereby the cross-sectional area of the magnetic path is increased. Comparing FIG. 9A and FIG. 9B with each other, in FIG. 9A, the concentrated magnetic fluxes flow pass through bearing 113, tubular portion 1111 and core inner circumferential portions 115c, 116c, and thus dispersed. More specifically, magnetic fluxes flow from pole teeth 115b to pole teeth 116b through core inner circumferential portion 115c (116c), tubular portion 1111 (more specifically, base portion 1111b) and bearing 113. On the other hand, as illustrated in FIG. 9B, if bearing 113A is a non-magnetic body, no magnetic fluxes flow in bearing 113A and thus, the cross-sectional area of the part that functions as a magnetic path decreases and magnetic saturation occurs, and therefore, in the actuator illustrated in FIG. 9B, the magnetic resistance increases and the magnetic flux amount decreases. Also, in FIG. 9B, core inner circumferential portions 115c, 116c are not in contact with each other, and thus the magnetic flux amount is decreased accordingly.

As described above, in the present embodiment, the cross-sectional area of the magnetic body that function as a magnetic path is large around rotation shaft 122 (in particular, the cross-sectional area is increased by the amount of the thickness of bearing 113), as illustrated in FIG. 10, magnetic fluxes flowing inward from pole teeth 116b positioned outside of the core so as to extend along the entire circumference of the core so as to surround the core are dispersed.

As described above, an increase in cross-sectional area of the magnetic path at the center part of the actuator, that is, the center part of the magnetic circuit enables effectively relief of magnetic saturation caused by magnetic flux concentration and thus enables further improvement in energy conversion coefficient (3.5% enhancement in maximum amplitude).

Also, according to the present embodiment, since bearing 113 is fixed to base plate 111 via press-fitting, the positional precision of bearing 113 in base plate 111 is enhanced, enabling accurate positioning of bearing 113 relative to rotation shaft 122 of movable body 120.

Also, movable body 120 is movably supported by fixed body 110 via spring material (torsion coil spring) 150, and spring material 150 is fixed to fixed body 110 (more specifically, base plate 111) via rib 161 and base fixing component 164 included in joint part 160. Joint part 160 includes attachment portion 160b to which the free end side of other end portion 154 of spring material 150 is fixedly attached, and stress relaxation section 160a disposed adjacent to attachment portion 160b, stress relaxation section 160a relaxing stress generated upon deformation of spring material 150. Consequently, when actuator 100 is driven and movable body 120 is brought into rotational reciprocating motion, even if stress is generated on other end portion 154 of spring material 150, the stress is disposed by the stress relaxation section, which prevents the stress from being locally concentrated in spring material 150 and thus increases the life of the spring. Consequently, actuator 100 can be driven for a long period of time, ensuring high reliability.

Also, other end portion 154 of spring material 150 is fixed to fixed body 110 (base plate 111) by rib 161 provided in the base plate and base fixing component 164 that enables a change in position of attachment of other end portion 154 to fixed body 110 (base plate 111). Consequently, even if there is a margin of manufacturing error in dimension in torsion coil springs, which spring materials 150, a decrease in assemblability of actuator 100 is prevented by cancelling the error when a torsion coil spring is assembled to actuator 100.

Various alterations can be made to the present invention described above as long as such alternations do not depart from the spirit of the present invention, and it should be understood that those resulting from such alterations fall within the scope of the present invention.

The entire disclosure of the description, the drawings and the abstract in Japanese Patent Application No. 2015-154528 filed on Aug. 4, 2015 is incorporated herein by reference.

INDUSTRIAL APPLICABILITY

An actuator and an electric beauty device according to the present invention have an effect of providing a high energy conversion coefficient and a high power with a simple configuration, and is effective for use in, e.g., an electric razor or an electric toothbrush.

REFERENCE SIGNS LIST 100 actuator
110 fixed body
111 base plate
112 alternate current input section
113, 113A bearing
114 coil section
114a bobbin
114b coil
115 upper yoke
115b, 116b pole tooth
115c, 116c core inner circumferential portion
116 lower yoke
120 movable body
122 rotation shaft
123 magnet
124 rotor cover section
150 spring material
160 joint part
152 one end portion
154 other end portion
1111 tubular portion

The invention claimed is:

1. An actuator comprising:
a movable body including a rotation shaft, and a cylindrical magnet section including N-pole faces and S-pole faces circumferentially alternately on a surrounding circumferential surface around the rotation shaft; and
a fixed body including a bearing that allows the rotation shaft to be inserted thereto, a number of pole teeth surfaces arranged so as to face the circumferential surface of the magnet section and circumferentially surrounding the bearing, the number of pole teeth surfaces being equal to a number of the N-pole faces and the S-pole faces, and a coil that upon supply of a current, excites the pole teeth surfaces so that the pole teeth surfaces have circumferentially alternately different polarities, wherein:
with a position at which a circumferential center of each pole teeth surface and a switching position between corresponding pole faces in the magnet face each other as a turning reference position, the movable body is held by the fixed body in such a manner that the movable body can turn circumferentially back and forth around the rotation shaft,
the fixed body comprises:
a base plate including a magnetic body, the base plate disposed so as to face the movable body,
a core including a magnetic body, the core disposed to surround the coil, and
a hollow tubular portion that is disposed to project toward a side of the movable body from the base plate and inside of which the bearing is press-fitted and fixed,
the bearing is a magnetic body,
the core includes two annular body plate portions disposed so as to axially sandwich the coil and include pole teeth surfaces in a comb teeth-like form, the pole teeth surfaces provided vertically from outer circumferential edges of the annular body plate portions, respectively and circumferentially alternately disposed so as to surround an outer circumferential surface of the coil in a circular pattern,
each of body plate portions includes a tubular core inner circumferential portion in center of each of the body plate portions formed so as to inserted to a center opening portion of the coil, respectively, and
the tubular core inner circumferential portions are disposed so as to be in abutment with each other inside the coil, externally fitted on the tubular portion, and form a magnetic path surrounding the outer circumferential side of the tubular portion jointly with the tubular portion and the bearing,
wherein a coil body is formed by circumferentially winding the coil around a bobbin that is coaxial to the rotation shaft,
the tubular core inner circumferential portions are inserted to an opening of the bobbin,
the hollow tubular portion includes a tube portion body and a base portion, the core is externally fitted on the tube portion body of the hollow tubular portion and resting on the base portion, and
the coil body is disposed so as to be axially spaced from the base plate, and the coil, the tubular core inner circumferential portions, the hollow tubular portion, and the bearing are disposed adjacent to each other.

2. The actuator according to claim 1, wherein the bearing is an oil-impregnated sintered bearing having a magnetic property.

3. The actuator according to claim 1, wherein the rotation shaft is a non-magnetic body.

4. An electric beauty device comprising an actuator according to claim 1.

* * * * *